United States Patent
Uchizono et al.

(10) Patent No.: US 12,479,021 B2
(45) Date of Patent: Nov. 25, 2025

(54) THIXOMOLDING MATERIAL AND METHOD OF MANUFACTURING THIXOMOLDING MATERIAL

(71) Applicant: SEIKO EPSON CORPORATION, Tokyo (JP)

(72) Inventors: Shunsuke Uchizono, Shiojiri (JP);
Yasutoshi Hideshima, Matsumoto (JP);
Setsuya Iwashita, Nirasaki (JP);
Tetsuhiko Takeuchi, Shimosuwa (JP);
Fumiya Maeda, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 61 days.

(21) Appl. No.: 18/088,820

(22) Filed: Dec. 27, 2022

(65) Prior Publication Data
US 2023/0201915 A1    Jun. 29, 2023

(30) Foreign Application Priority Data

Dec. 28, 2021 (JP) .................... 2021-213932

(51) Int. Cl.
| | | |
|---|---|---|
| B22D 17/00 | (2006.01) | |
| B22D 21/04 | (2006.01) | |
| B22F 1/05 | (2022.01) | |
| C22C 1/12 | (2023.01) | |

(52) U.S. Cl.
CPC .......... *B22D 17/007* (2013.01); *B22D 21/04* (2013.01); *B22F 1/05* (2022.01); *C22C 1/12* (2023.01)

(58) Field of Classification Search
CPC ............ B22D 17/007; B22F 1/05; C22C 1/12
See application file for complete search history.

(56) References Cited

U.S. PATENT DOCUMENTS

| | | | |
|---|---|---|---|
| 2005/0016638 A1* | 1/2005 | Kondoh | ............. C04B 35/6261 |
| | | | 148/420 |
| 2005/0089435 A1* | 4/2005 | Kondoh | ................. C22C 23/02 |
| | | | 148/420 |
| 2006/0057015 A1 | 3/2006 | Kondoh | |
| 2007/0104606 A1 | 5/2007 | Moll et al. | |
| 2008/0213118 A1 | 9/2008 | Kondoh | |
| 2014/0023547 A1 | 1/2014 | Mitooka et al. | |

FOREIGN PATENT DOCUMENTS

| | | | |
|---|---|---|---|
| JP | H0912374 A | * | 1/1997 |
| JP | 2005248325 A | * | 9/2005 |
| JP | 2006137861 A | * | 6/2006 |
| JP | 2007-510545 A | | 4/2007 |

(Continued)

*Primary Examiner* — Anthony M Liang
(74) *Attorney, Agent, or Firm* — Harness, Dickey & Pierce, P.L.C.

(57) ABSTRACT

A thixomolding material includes: a metal body containing magnesium(Mg) as a primary component; a plurality of coating particles provided at a front surface of the metal body and having an average particle diameter equal to or less than 100 µm, the plurality of coating particles being made of an inorganic material differing from the metal body; and an interposed particle interposed between the metal body and the coating particles and having an average particle diameter smaller than the coating particle, the interposed particle being made of an inorganic oxide.

6 Claims, 3 Drawing Sheets

(56) References Cited

FOREIGN PATENT DOCUMENTS

| JP | 2007-239050 A | 9/2007 |
| WO | 2003/027342 A1 | 4/2003 |
| WO | 2003/069001 A1 | 8/2003 |
| WO | 2004/062837 A1 | 7/2004 |
| WO | 2012/137907 A1 | 10/2012 |

* cited by examiner

THIXOMOLDING MATERIAL AND METHOD OF MANUFACTURING THIXOMOLDING MATERIAL

The present application is based on, and claims priority from JP Application Serial Number 2021-213932, filed on Dec. 28, 2021, the disclosure of which is hereby incorporated by reference herein in its entirety.

BACKGROUND

1. Technical Field

The present disclosure relates to a thixomolding material and a method of manufacturing a thixomolding material.

2. Related Art

Magnesium has a small specific gravity, and also has properties such that an electromagnetic wave shielding property, vibration damping performance, machinability, and biological safety are all favorable. In view of these circumstances, components made of a magnesium alloy have begun to be used in the field of products such as automobile parts, airplane parts, cellular phones, and laptop computers.

A thixomolding method is known as a method of manufacturing parts made of magnesium. The thixomolding method is a molding method in which a raw material in the form of pellets or chips is heated in a cylinder to make it converted into a solid-liquid coexistent state where a liquid phase and a solid phase coexist. Then, with a screw being caused to turn, a thixotropic property emerges, and the thus obtained semi-solid substance is injected into a mold. With such a thixomolding method, the fluidity of the semi-solid substance is enhanced through heating and shearing, which makes it possible to form thin components or components having a complicated shape, as compared with a die casting method.

In the thixomolding method, for example, a molding chip in the form of chip is used as a raw material, as described above.

For example, WO2012/137907 discloses a molding chip in which 0.01 to 3 weight % of carbon black is added to a magnesium chip to mix both of them using a mixer, so that a front surface of the magnesium chip is coated with the carbon powder. With such a molding chip coated with carbon powder, carbon powder disperses in the molded product manufactured through injection molding, which makes it possible to enhance the bending property and the tensile strength of the molded product.

In a case of the molding chip described in WO2012/137907, carbon powder is more likely to fall off when it is fed into the cylinder. If the carbon powder falls off, it is not possible to uniformly mix the carbon powder and a semi-melted substance of magnesium within the cylinder. Thus, components derived from the carbon powder are unevenly distributed, which produces a problem in that the mechanical property of the molded product cannot be sufficiently enhanced.

SUMMARY

A thixomolding material according to an application example of the present disclosure includes a metal body containing magnesium(Mg) as a primary component, a plurality of coating particles provided at a front surface of the metal body and having an average particle diameter equal to or less than 100 μm, the plurality of coating particles being made of an inorganic material differing from the metal body, and an interposed particle interposed between the metal body and the coating particles and having an average particle diameter smaller than the coating particles, the interposed particle being made of an inorganic oxide.

A method of manufacturing a thixomolding material according to an application example of the present disclosure includes a preparation step of preparing a mixture containing a metal body containing magnesium (Mg) as a primary component, a coating particle having an average particle diameter equal to or less than 100 μm and having a mechanical property higher than the metal body, an interposed particle having an average particle diameter smaller than the coating particle and made of an inorganic oxide, and a dispersion medium, an agitation step of agitating the mixture, and a drying step of causing the coating particle to be attached to a front surface of the metal body through the interposed particle by removing at least a portion of the dispersion medium from the agitated mixture.

DESCRIPTION OF EXEMPLARY EMBODIMENTS

Below, a thixomolding material and a method of manufacturing a thixomolding material according to the present disclosure will be described in detail on the basis of the embodiment illustrated in the attached drawings.

1. Thixomolding Method

First, description will be made of a thixomolding method using a thixomolding material according to the embodiment.

The thixomolding method is a molding method in which a material in the form of pellets or chips is heated in a cylinder to make it converted into a solid-liquid coexistent state where a liquid phase and a solid phase coexist. Then, with a screw being caused to turn, a thixotropic property is caused to emerge, and the thus obtained semi-solid substance is injected into a mold. With such a thixomolding method, the fluidity of the semi-solid substance is enhanced through heating and shearing, which makes it possible to form thin components or components having a complicated shape, as compared, for example, with a die casting method.

Figure 1:
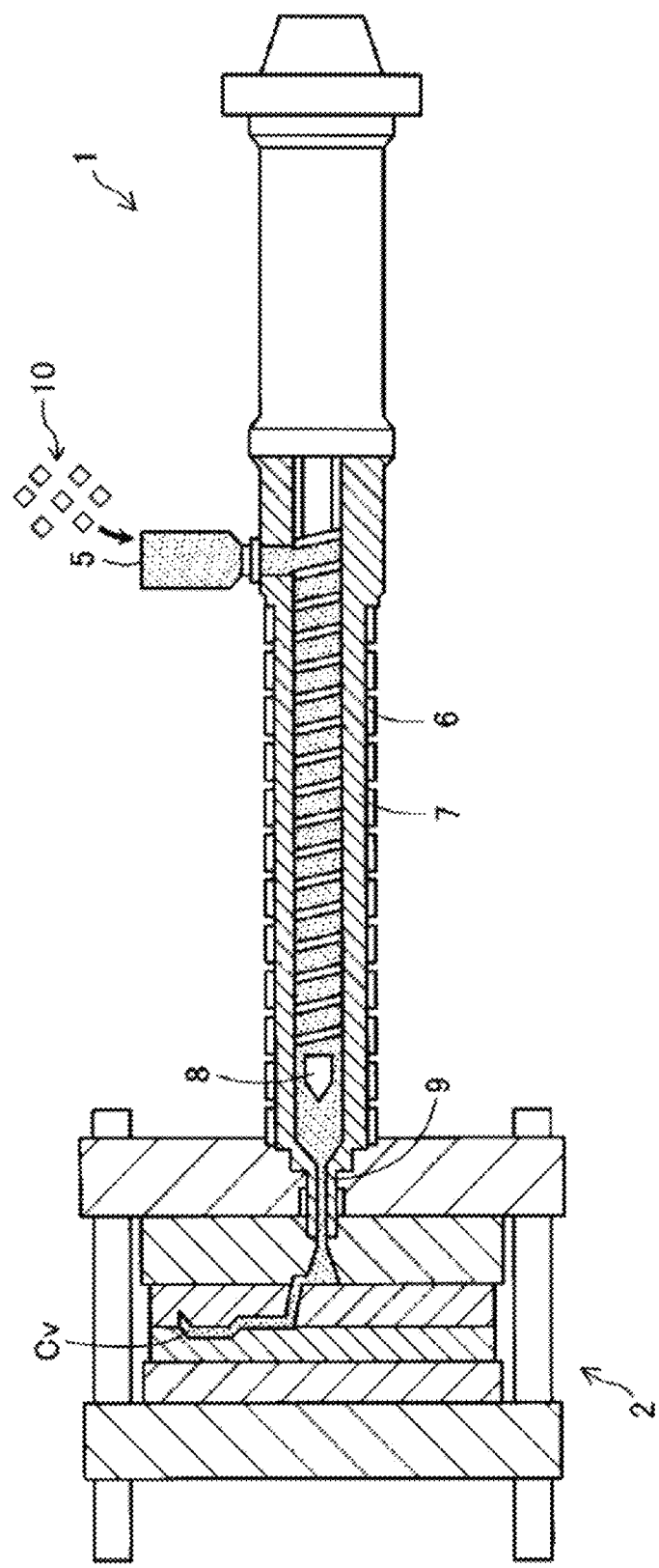
FIG. 1 is a cross-sectional view illustrating one example of an injection molding machine used in a thixomolding method.

FIG. 1 is a cross-sectional view illustrating one example of an injection molding machine used in the thixomolding method.

As illustrated in FIG. 1, an injection molding machine 1 includes a mold 2, a hopper 5, a heating cylinder 7, a screw 8, and a nozzle 9. The mold 2 forms a cavity Cv. When a thixomolding material 10 is fed in the hopper 5, the thixomolding material 10 is supplied to the heating cylinder 7. The thixomolding material 10 supplied to the heating cylinder 7 is transferred while being heated by a heater 6 and being sheared by the screw 8. This brings the thixomolding material 10 in a semi-melted state to form a slurry. The thus obtained slurry is caused to exit through the nozzle 9 to the cavity Cv within the mold 2 without contacting the outer air. Then, by cooling the slurry exiting to the cavity Cv, a thixomolded body is obtained.

Note that other materials together with the thixomolding material 10 may be fed into the hopper 5.

2. Thixomolding Material

Next, the thixomolding material according to the embodiment will be described.

Figure 2:
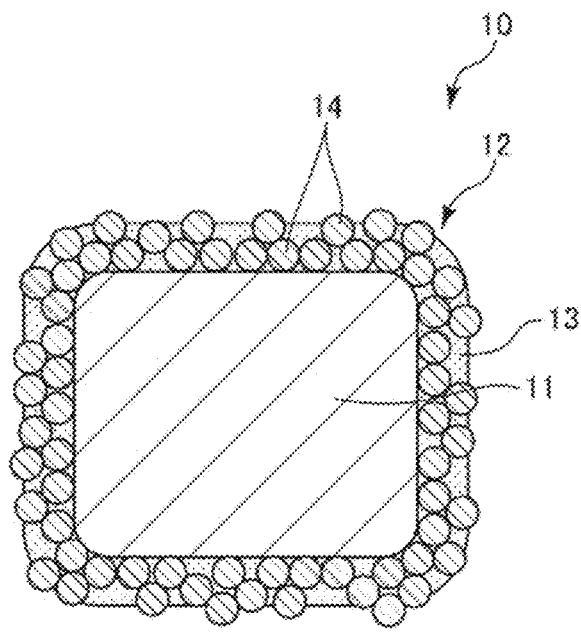
FIG. 2 is a cross-sectional view schematically illustrating a thixomolding material according to the embodiment.
Figure 3:
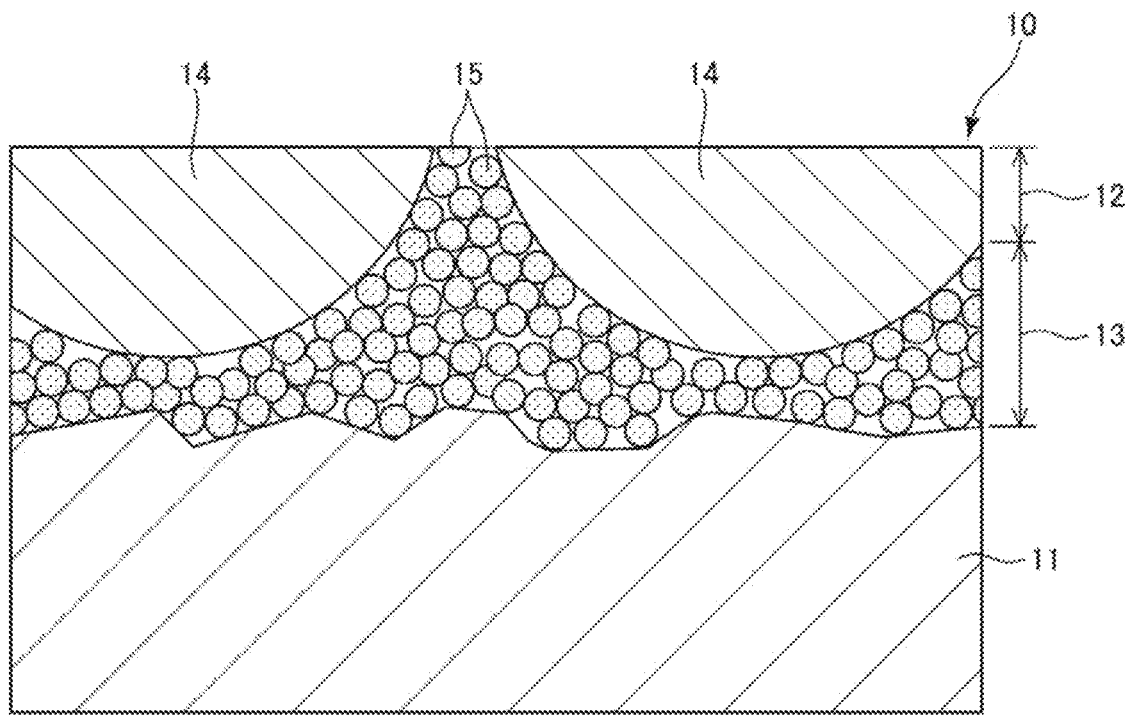
FIG. 3 is a diagram in which a portion illustrated in FIG. 2 is enlarged.

FIG. 2 is a cross-sectional view schematically illustrating the thixomolding material according to the embodiment. FIG. 3 is a partial enlarged diagram of FIG. 2.

The thixomolding material 10 illustrated in FIG. 2 is a raw material used in the thixomolding method, and includes a metal body 11 in the form of chip, a coating portion 12 provided at the front surface of the metal body 11, and an adhesive portion 13 existing between the metal body 11 and the coating portion 12.

The coating portion 12 includes a plurality of coating particles 14, as illustrated in FIG. 2. The coating particles 14 is provided at the front surface of the metal body 11 and has an average particle diameter equal to or less than 100 μm. In addition, the coating particles 14 are made of an inorganic material differing from the metal body 11.

The adhesive portion 13 includes an interposed particle 15 existing between the metal body 11 and the coating particle 14, as illustrated in FIG. 3. The interposed particle 15 has an average particle diameter smaller than that of each of the coating particles 14, and is made out of an inorganic oxide.

By performing thixomolding using such a thixomolding material 10, the adhesive portion 13 containing the interposed particle 15 works to suppress falling off of the coating particle 14, which will be described in detail later. This makes the semi-melted substance of the metal body 11 and the coating particle 14 more likely to be uniformly mixed within the heating cylinder 7. This makes it possible to uniformly disperse the coating particles 14 in the thixomolded body. Thus, it is possible to obtain an effect in which the property of the thixomolded body is enhanced due to the coating particles 14.

2.1. Metal Body

The metal body 11 is a piece obtained, for example, by machining or cutting a magnesium-based alloy casted using a mold or the like. Note that the method of manufacturing the metal body 11 is not limited to this.

The metal body 11 contains Mg as a primary component and also contains various types of additive components. The additive components include, for example, lithium, beryllium, calcium, aluminum, silicon, manganese, iron, nickel, copper, zinc, strontium, yttrium, zirconium, silver, tin, gold, rare earth metal, or the like, and of these components, one type or a mixture of two or more types is used. The rare earth metal includes, for example, cerium.

The primary component is an element having the highest content rate among substances contained in the metal body 11. The content rate of the primary component is preferably more than 50 mass %, is more preferably equal to or more than 70 mass %, and is still more preferably equal to or more than 80 mass %.

It is preferable that the additive components include aluminum and zinc. Thus, the melting point of the metal body 11 decreases, and the fluidity of the slurry improves. This makes it possible to enhance the molding property of the thixomolding material 10.

Furthermore, in addition to aluminum and zinc, it is preferable that the additive components contain at least one type selected from a group consisting of manganese, yttrium, strontium, and rare earth metal. This makes it possible to enhance the mechanical property, corrosion resistance, wear resistance, and the thermal conductivity of the thixomolded body.

The additive components exist in the metal body 11 in a state of a single substance, an alloy, an oxide, an intermetallic compound, or the like. Further, in the metal body 11, the additive components may be segregated at a grain boundary of a metal structure such as magnesium (Mg) or the magnesium alloy, or may be uniformly dispersed.

The average particle diameter of the metal body 11 is not particularly limited, but is preferably equal to or more than 0.5 mm, and more preferably not less than 1.5 mm and not more than 10.0 mm. By setting the average particle diameter so as to fall in the ranges described above, it is possible to suppress occurrence of bridge or the like within the heating cylinder 7 of the injection molding machine 1.

Note that the average particle diameter of the metal body 11 is an average value of diameters of circles having the same area as the projected area of the metal body 11. The average value is calculated using 100 or more pieces of metal bodies 11 that have been selected randomly.

The average aspect ratio of the metal body 11 is preferably equal to or less than 5.0, and is more preferably equal to or less than 4.0. The metal body 11 having such an average aspect ratio enhances the filling property in the heating cylinder 7, and also achieves favorable temperature uniformity during heating. This makes it possible to obtain a thixomolded body having a high mechanical property and also having dimensional accuracy.

Note that the average aspect ratio of the metal body 11 is an average value of aspect ratios calculated on the basis of the major axis/minor axis in a projected image of the metal body 11. The average value is calculated using 100 or more pieces of metal bodies 11 that have been selected randomly. The major axis is the allowable maximum length in a projected image, and the minor axis is the maximum length in a direction orthogonal to the major axis.

In addition, a given surface treatment may be applied to the metal body 11 on an as-necessary basis. The surface treatment includes, for example, a plasma treatment, a corona treatment, an ozone treatment, an ultraviolet radiation treatment, a surface roughening treatment, or the like.

2.2. Coating Portion

The coating portion 12 includes the plurality of coating particles 14. In the present embodiment, the plurality of coating particles 14 are caused to be distributed so as to cover the front surface of the metal body 11 to configure the coating portion 12, as illustrated in FIG. 2. It is preferable that the coating portion 12 entirely covers the front surface of the metal body 11. However, the coating portion 12 may partially cover the front surface of the metal body 11.

The coating particles 14 are made of an inorganic material differing from the metal body 11. With this configuration, the coating particles 14 disperse in the thixomolded body, which makes it possible to add a property resulting from the coating particles 14 to a matrix obtained by solidifying a semi-melted substance of the metal body 11. In addition, since the coating particles 14 are made of an inorganic material, the boiling point or the temperature at which thermal decomposition occurs is relatively high. Thus, the possibility that the coating particles 14 gasify during thixomolding reduces, which makes it possible to prevent the coating particles 14 from serving as a cause of molding malfunction.

There is no specific limitation as to the constituent material of the coating particles 14, and it is only necessary that the coating particles 14 are made of an inorganic material. For example, the constituent element thereof includes a metal material, a ceramic material, a silicon material, a carbon material, a glass material, a boron material, a germanium material, or the like. Each of these materials may be a composite material. For example, the metal material may be a composite material of metal and other materials. Note that, if the primary component is the material as described above, the inorganic material may contain a small amount of an organic material, that is, may contain, for example, an organic material equal to or less than 10 mass % of the entire coating particles 14.

In particular, it is preferable that the constituent material of the coating particles 14 includes a metal material, a ceramic material, a silicon material, or a carbon material. These materials are excellent in properties such as Young's modulus, hardness, thermal conductivity, or the like, and are stable from the chemical viewpoint. Thus, the coating particles 14 made of these materials are able to add these properties to a matrix of the thixomolded body that is derived from the metal body 11. Thus, it is possible to enhance the added value of the thixomolded body.

The metal material includes a single substance of any metallic elements, an alloy, a compound, or an intermetallic compound. As specific examples, it may be possible to use an iron-based alloy such as carbon steel, cast iron, and stainless steel, aluminum or an alloy thereof, titanium or an alloy thereof, nickel or an alloy thereof, copper or an alloy thereof, zinc or an alloy thereof, or the like. Note that the compound includes an oxide, carbides, nitrides, fluoride, boride, or the like.

The ceramic material includes, for example, alumina, zirconia, titania, magnesia, yttria, forsterite, cordierite, mullite, steatite, nitriding boron, boron carbide, aluminum nitride, calcium fluoride, magnesium fluoride, or the like.

The silicon material includes, for example, silicon (single substance of silicon), silica (silicon oxide), silicon nitride, silicon carbide, or the like.

The carbon material includes, for example, graphite, diamond, carbon black, carbon nanotube, carbon fiber (carbon fiber), or the like.

It is preferable that the constituent material of the coating particles 14 has a higher mechanical property or higher thermal property than that of the constituent material of the metal body 11.

Of these properties, the mechanical property includes, for example, Young's modulus, hardness, toughness, strength, or the like. By using the coating particles 14 made of these materials having excellent mechanical property, it is possible to add the excellent mechanical property of these materials, to a matrix containing magnesium as a primary component. Thus, it is possible to achieve a thixomolded body having excellent mechanical properties added thereto, without deteriorating the advantage such as light weight and excellent vibration absorbing property that magnesium originally has.

In addition, the thermal property includes, for example, thermal conductivity, coefficient of thermal expansion, or the like. By using the coating particles 14 made of these materials having excellent thermal properties, it is possible to add the excellent thermal properties of these materials, to a matrix containing magnesium as a primary component. Thus, it is possible to achieve a thixomolded body having excellent thermal properties added thereto, without deteriorating the advantage such as light weight and excellent vibration absorbing property that magnesium originally has.

Note that properties other than those described above of the constituent material of the coating particles 14 may be higher than those of the constituent material of the metal body 11. In addition, the properties described above or other properties of the constituent material of the coating particles 14 may be lower than those of the constituent material of the metal body 11. By setting the properties to be lower, it is also possible to provide the thixomolded body with added values.

Although the average particle diameter of the coating particles 14 is set to be equal to or less than 100 µm, the average particle diameter is preferably not less than 0.1 µm and not more than 25 µm, and is more preferably not less than 0.5 µm and not more than 15 µm. By setting the average particle diameter of the coating particles 14 to fall in the ranges described above, it is possible to optimize the balance between the ratio of coating of the coating portion 12 and the content of the coating particles 14 in the thixomolding material 10. In addition, when the coating particles 14 are caused to be attached to the front surface of the metal body 11, it is possible to cause the coating particles 14 to uniformly distribute and to make the coating particles 14 less likely to fall off.

Note that, when the average particle diameter of the coating particles 14 is less than the lower limit value, the coating particles 14 are less likely to disperse. This may lead to a possibility that the balance described above deteriorates, and the properties of the thixomolded body are not able to be sufficiently enhanced. On the other hand, when the average particle diameter of the coating particles 14 is higher than the upper limit value, the coating particles 14 are more likely to fall off.

The average particle diameter of the coating particles 14 is the number-base average particle diameter based on calculation using 100 or more pieces of measured data obtained by measuring the particle size of each of the coating particles 14 on an observed image of the coating particles 14 observed using a microscope in an enlarged manner. Note that, as for the microscope, for example, a scanning electron microscope is preferably used.

The mass fraction of the coating particles 14 in the total mass of the metal body 11 and the coating particles 14 is preferably not less than 1.0 mass % and not more than 40.0 mass %, is more preferably not less than 1.5 mass % and not more than 30.0 mass %, and is yet more preferably 5.0 mass % or more 20.0 mass %. By setting the mass fraction of the coating particles 14 to fall in the ranges described above, it is possible to add the property derived from the coating particles 14 to the thixomolded body, without largely deteriorating the advantage derived from the metal body 11 to be manufactured. In addition, it is possible to suppress occurrence of excess coating particles 14 and reduce the number of coating particles 14 that fall off, and it is also possible to suppress a deterioration in the molding property of the thixomolding material 10.

Note that, when the mass fraction of the coating particles 14 is less than the lower limit value, there is a possibility that the properties derived from the coating particles 14 cannot be sufficiently added to the thixomolded body. On the other hand, when the mass fraction of the coating particles 14 is more than the upper limit value, there is a possibility that the number of coating particles 14 that fall off from the thixomolding material 10 increases or the molding property of the thixomolding material 10 deteriorates.

The coating portion 12 may contain a substance other than the coating particles 14. In this case, it is only necessary that the content of the substance other than the coating particles 14 is less than the content of the coating particles 14, is preferably equal to or less than 30 mass % of the coating particles 14, and is more preferably equal to or less than 10 mass %.

In addition, the coating particles 14 may be mixed particles in which two or more types of particles having constituent materials differing from each other are mixed. With this configuration, it is possible to obtain the thixomolding material 10 that makes it possible to manufacture a thixomolded body having properties that different materials have. Furthermore, in this case, the particle sizes may differ according to types of the particles.

In addition, a given surface treatment may be applied to the coating particles 14 on an as-necessary basis. The surface treatment includes, for example, a plasma treatment, a corona treatment, an ozone treatment, an ultraviolet radiation treatment, a surface roughening treatment, a coupling agent treatment, or the like.

2.3. Adhesive Portion

The adhesive portion 13 exists between the metal body 11 and the coating particles 14. In addition, the adhesive portion 13 may exist between the coating particles 14.

The adhesive portion 13 includes the interposed particle 15. The interposed particle 15 is a particle having an average particle diameter smaller than that of the coating particles 14 and made of an inorganic oxide. Such an interposed particle 15 is very small, and hence, easily enter a portion between the metal body 11 and the coating particles 14 or between coating particles 14. The interposed particle 15 is very small and the specific surface area thereof is extremely wide. Thus, it is considered that the interposed particle 15 strongly interact with both the metal body 11 and the coating particles 14. An example of the interaction includes intermolecular force such as hydrogen bond or van der Waals force, an anchor effect occurring as a result of a collective body of the interposed particle 15 entering the concave and convex existing on the front surface of the metal body 11, or the like. In particular, an inorganic oxide has a hydroxy group existing at the front surface of the interposed particle 15 at a high density. It is considered that this hydroxy group creates hydrogen bond with the metal body 11 or the coating particles 14, and this serves as the driving force of the interaction. With such interaction, the adhesive portion 13 has a function of anchoring the coating particle 14 at the front surface of the metal body 11.

In addition, such an inorganic oxide is less likely to gasify, and is less likely to have any adverse effect on the property of the thixomolded body even when entering the thixomolded body. Thus, it is possible to suppress occurrence of molding malfunction associated with gasification, and to obtain the thixomolded body having excellent properties.

There is no particular limitation as to the constituent material of the interposed particle 15 as long as the constituent material thereof is an inorganic oxide. For example, it may be possible to use a silicon oxide, an aluminum oxide, a zirconium oxide, or the like, and it may be possible to use a composite material containing at least one type of these materials. Note that the inorganic oxide may include a small amount of additives, for example, may contain a given additive equal to or less than 20 mass % of the entire interposed particle 15 as long as the inorganic oxide contains an oxide described above as a primary component.

In particular, it is preferable that the inorganic oxide is a silicon oxide. The silicon oxide combines with magnesium to generate an alloy or intermetallic compound, which makes it to possible to enhance the mechanical property of the thixomolded body. That is, when the silicon oxide combines with magnesium, the silicon oxide is less likely to impair the advantages that magnesium originally has and hence, is useful. In addition, the silicon oxide causes a large number of hydroxy groups to be generated at the front surface of the interposed particle 15, and hence, is useful as a constituent element of the interposed particle 15 that strongly interacts with the metal body 11 and the coating particles 14.

It is only necessary that the average particle diameter of the interposed particle 15 is smaller than the average particle diameter of the coating particles 14. Specifically, the average particle diameter of the interposed particle 15 is preferably equal to or less than 20% of the average particle diameter of the coating particles 14, is more preferably equal to or less than 10%, and is yet more preferably equal to or less than 5%. With this configuration, the interposed particle 15 particularly easily enters a portion between the metal body 11 and the coating particles 14 or between coating particles 14. In addition, the specific surface area of the interposed particle 15 particularly increases.

Note that the lower limit value may not be necessarily set. However, the lower limit value is preferably equal to or more than 0.01% of the coating particles 14, is more preferably equal to or more than 0.05%, and is yet more preferably equal to or more than 0.10% for the reasons that the interposed particles 15 are more likely to coagulate, handling of the interposed particle 15 becomes difficult, or the like.

In addition, the average particle diameter of the interposed particle 15 is preferably not less than 1 nm and not more than 100 nm, is more preferably not less than 10 nm and not more than 80 nm, and is yet more preferably not less than 20 nm and not more than 60 nm. When the average particle diameter falls in the ranges described above, the interposed particle 15 particularly easily enters a portion between the metal body 11 and the coating particles 14 or between coating particles 14. In addition, the specific surface area of the interposed particle 15 particularly increases. On the other hand, when the average particle diameter falls in the ranges described above, it is possible to suppress coagulation between interposed particles 15.

The average particle diameter of the interposed particle 15 is the number-base average particle diameter based on calculation using 100 or more pieces of measured data obtained by measuring the particle size of the interposed particle 15 on an observed image of the interposed particle 15 observed using a microscope in an enlarged manner. Note that, as for the microscope, for example, a transmission electron microscope TEM is preferably used.

On the assumption that the content of coating particles 14 is set as 100 parts by mass, the content of the interposed particle 15 is preferably not less than 3.0 parts by mass and not more than 30.0 parts by mass, is more preferably not less than 5.0 parts by mass and not more than 25.0 parts by mass, and is yet more preferably not less than 10.0 parts by mass and not more than 20.0 parts by mass. By setting the content of the interposed particle 15 relative to the coating particle 14 so as to fall in the ranges described above, it is possible to set the content of the interposed particle 15 to a necessary and sufficient amount that enables the coating particles 14 to be anchored at the metal body 11. Thus, when the content of the interposed particle 15 is less than the lower limit value, the content of the interposed particle 15 is not sufficient, which may lead to an increase in the number of the coating particles 14 that fall off. On the other hand, when the content of the interposed particle 15 is more than the upper limit value, excess interposed particles 15 occur, and there is a possibility of deteriorating the advantages that magnesium originally has, or deteriorating the properties added by the coating particles 14.

Note that the interposed particle 15 may be a mixed particle in which two or more types of particles having constituent materials differing from each other are mixed. Furthermore, in this case, the particle sizes may differ according to types of the particles.

In addition, a given surface treatment may be applied to the interposed particle 15 on an as-necessary basis. The surface treatment includes, for example, a plasma treatment, a corona treatment, an ozone treatment, an ultraviolet radiation treatment, a surface roughening treatment, a coupling agent treatment, or the like.

Note that the adhesive portion 13 may contain a substance other than the interposed particle 15. In this case, it is only necessary that the content of the substance other than the interposed particle 15 is less than the content of the interposed particle 15 in mass ratio, is preferably equal to or less than 10 mass % of the interposed particle 15, and is more preferably equal to or less than 5 mass %.

The substance other than the interposed particle 15 includes, for example, an organic binder. The organic binder strengthens the anchoring of the coating particle 14 by the interposed particle 15 to enhance the adhesive force of the adhesive portion 13. In addition, by using both the interposed particle 15 and the organic binder, it is possible to obtain the effects described above while reducing the amount of use of the organic binder.

The organic binder used includes, for example, polyolefin such as polyethylene, polypropylene, and ethylene-acetate copolymer, acrylic resin such as polymethyl methacrylate and poly-butyl methacrylate, styrene-based resin such as polystyrene, polyester such as polyvinyl chloride, polyvinylidene chloride, polyamide, polyethylene terephthalate, and polybutylene terephthalate, polyether, polyvinyl alcohol, polyvinylpyrrolidone, or various types of resin of copolymer or the like of these materials, and also includes waxes, alcohols, higher fatty acid, fatty acid metal, higher fatty acid ester, higher fatty acid amide, nonionic surfactant, silicone-based lubricant, or the like. In addition, the binder may be a mixture containing at least one type of these components and other components, or may be a mixture containing two or more types of these components.

Of these materials, it is preferable that the binder contains waxes, and it is more preferable that the binder contains paraffin wax or its derivative. Waxes have a favorable bonding property.

The waxes include, for example, natural wax including plant-based wax such as candelilla wax, carnauba wax, rice wax, Japan wax, and jojoba oil, animal-based wax such as beeswax, lanolin, and spermaceti, mineral-based wax such as montan wax, ozokerite, and ceresine, and petroleum-based wax such as paraffin wax, microcrystalline wax, and petrolatum, and also include synthetic wax including synthetic hydrocarbon such as polyethylene wax, modified wax such as a montan wax derivative, a paraffin wax derivative, a microcrystalline wax derivative, hydrogenated wax such as hydrogenated castor oil and a hydrogenated castor oil derivative, a fatty acid such as 12-hydroxystearic acid, acid amide such as octadecanamide, ester such as phthalic anhydride imide, and the like.

2.4. Effects Obtained from Thixomolding Material According to the Embodiment

As described above, the thixomolding material 10 according to the embodiment includes the metal body 11, the plurality of coating particles 14, and the interposed particle 15. The metal body 11 contains magnesium (Mg) as a primary component. The plurality of coating particles 14 are provided at the front surface of the metal body 11, and have an average particle diameter equal to or less than 100 µm. The plurality of coating particles 14 are made of an inorganic material differing from the metal body 11. The interposed particle 15 exists between the metal body 11 and the coating particle 14, and has an average particle diameter smaller than that of the coating particle 14. The interposed particle 15 is made of an inorganic oxide.

With the thixomolding material 10 as described above, the metal body 11 and the coating particles 14 are firmly anchored through the interposed particle 15, which makes the coating particles 14 less likely to fall off. Thus, when the thixomolding material 10 is fed into the heating cylinder 7 during thixomolding, it is more likely that the semi-melted substance of the metal body 11 and the coating particles 14 are uniformly mixed. This makes it possible to uniformly disperse the coating particles 14 in the thixomolded body. Thus, it is possible to obtain the thixomolded body having a high added value and having the properties derived from the coating particles 14 while maintaining the properties derived from the metal body 11.

In addition, the inorganic oxide is less likely to gasify, and is less likely to have any adverse effect on the property of the thixomolded body even when entering the thixomolded body. On the contrary, as with the coating particles 14, the interposed particle 15 made of an inorganic oxide uniformly disperses in the thixomolded body, and it is possible to strengthen the thixomolded body. Thus, it is possible to not only obtain the effect of suppressing the occurrence of molding malfunction associated with gasification but also obtain the effect of adding the properties derived from the interposed particle 15 to the thixomolded body.

Note that the thixomolding material 10 may contain additives other than the metal body 11, the coating portion 12, and the adhesive portion 13 described above. The additives include, for example, a surface-active agent, lubricant, antioxidant, a UV absorber, a thickening agent, anti-corrosives, preservative, fungi-proof agent, or the like.

3. Method of Manufacturing a Thixomolding Material

Next, a method of manufacturing the thixomolding material 10 described above will be described.

Figure 4:
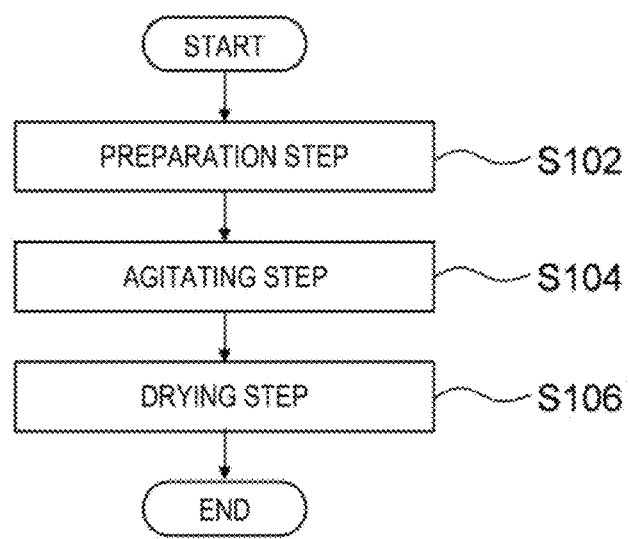
FIG. 4 is a process diagram used to explain a method of manufacturing a thixomolding material according to the embodiment.

FIG. 4 is a process diagram used to explain a method of manufacturing a thixomolding material according to the embodiment.

The method of manufacturing the thixomolding material 10 illustrated in FIG. 4 includes a preparation step S102, an agitating step S104, and a drying step S106.

3.1. Preparation Step

The preparation step S102 is configured to prepare a mixture including the metal body 11, the coating particles 14, the interposed particle 15, and a dispersion medium. This mixture is a dispersion liquid in which the metal body 11, the coating particles 14, and the interposed particle 15 are dispersed using a sufficient amount of dispersion medium.

There is no particular limitation as to the dispersion medium as long as the medium does not change the quality of the metal body 11, the coating particles 14, and the interposed particle 15. An example of the dispersion medium includes water, isopropyl alcohol, acetone, or the like. Note that, in this step, it may be possible to prepare a mixture that has been already created. In addition, by inputting water in the dispersion medium, it is possible to introduce a hydroxy group having a higher density at the front surfaces of the metal body 11, the coating particles 14, and the interposed particle 15.

There is no particular limitation as to the amount of the dispersion medium in the mixture. However, it is preferable that the amount thereof is the amount at which the metal body 11, the coating particles 14, and the interposed particle 15 are submerged in the dispersion medium when the mixture is put into the container. Specifically, the amount thereof is preferably 1.1 times or more of the metal body 11, the coating particles 14, and the interposed particle 15 in volume ratio, and is more preferably 1.2 times or more and 3.0 times or less.

Note that any given additive agent may be added to the mixture. The additive agent includes, for example, a dispersing agent, a thickening agent, a surface-active agent, an anti-foaming agent, or the like. In addition, when the adhesive portion 13 contains the organic binder described above, an organic binder may be added as the additive agent.

3.2. Agitating Step

In the agitating step S104, the mixture is agitated. For example, the agitation employs a method using an agitating bar, an agitating piece, or the like, a method of shaking a container that accommodates the mixture and is closed with a lid, or the like. With such agitation, it is possible to cause the coating particles 14 to be attached to the front surface of the metal body 11 through the interposed particle 15. Note that a portion of the coating particles 14 may be attached directly at the front surface of the metal body 11 rather than being attached through the interposed particle 15. In addition, at this stage, the coating particles 14 may be attached to the front surface of the metal body 11 with weak adhesive force.

In addition, with the agitation, it is possible to prevent the metal bodies 11 from coagulating each other to form a cluster or prevent the coating particles 14 from coagulating each other to form a cluster or prevent the interposed particles 15 from coagulating each other to form a cluster.

3.3. Drying Step

In the drying step S106, the mixture is dried. With this step, the coating particles 14 attached to the front surface of the metal body 11 through the interposed particle 15 is more firmly attached to the metal body 11. For example, when the hydroxy group existing at the front surface of the interposed particle 15 and the hydroxy group existing at the front surface of the metal body 11 or the coating particles 14 bond with each other with weak adhesive force by hydrogen connection or the like, dehydration condensation occurs through this step, which cause them to bond with each other with stronger adhesive force. For example, when the constituent material of the interposed particle 15 is a silicon oxide (silica), a silanol group exists at the front surface. Thus, through this step, dehydration condensation occurs to generate siloxane bond between individual interposed particles 15, and the interposed particles 15 work as an adhesive. In this manner, the coating particles 14 are anchored at the metal body 11.

A method of heating the mixture or a method of exposing the mixture to a gas or the like is used in drying. Of these methods, in a case where the mixture is heated, it is only necessary to use, for example, a hot bath or the like to heat the entire container that accommodates the mixture. Note that, in the drying step S106, all the dispersion media in the mixture may be removed. However, a portion of the dispersion media may not be removed and may be left.

It is only necessary that the temperature at which the mixture is heated is equal to or more than a temperature at which the dispersion medium volatilizes. Specifically, this temperature is set in accordance with the composition of the dispersion medium, and is preferably not less than 50° C. and not more than 300° C., and is more preferably not less than 100° C. and not more than 250° C., and is yet more preferably not less than 150° C. and not more than 230° C. With this setting, it is possible to efficiently make the dispersion medium volatilize and remove it while suppressing thermal denaturation of the metal body 11, the coating particles 14, and the interposed particle 15.

Note that, in this step, it is only necessary that the dispersion medium volatilizes and is removed. Thus, at the time of heating the mixture, the heating temperature is not necessary to increase to an excessively high temperature. For example, by also using a method of introducing a gas, it is possible to further reduce the heating temperature. When the heating temperature is able to be reduced, it is possible to reduce the influence of high temperatures on the metal body 11 and the coating particles 14. In other words, before thixomolding, it is possible to minimize the influence of heat acting on the metal body 11 and the coating particles 14. This makes it possible to reduce the influence of heat applied in association with the drying process for a long period of time.

In addition, the period of time in which the mixture is heated is set on an as-necessary basis in accordance with the heating temperature. This period of time is set, as one example, preferably to not less than 10 minutes and not more than 300 minutes, more preferably to not less than 20 minutes and not more than 200 minutes, and yet more preferably to not less than 60 minutes and not more than 150 minutes.

In this manner, it is possible to obtain the thixomolding material 10.

Note that it may be possible to employ a configuration in which the agitating step S104 and the drying step S106 are performed at the same time.

Furthermore, it may be possible to employ a configuration in which, after the drying step S106, the metal body 11 that has already been subjected to the drying step S106 is fed in the mixture described above again, and the agitating step S104 and the drying step S106 are repeated. With this configuration, attaching the coating particles 14 is repeated, which makes it possible to attach the coating particle 14 at the front surface of the metal body 11 in a multi-layered manner. Thus, it is possible to attach more coating particles 14 at the front surface of the metal body 11. The number of times of repeating is not particularly limited. However, the number is set, for example, to not less than two times and not more than 10 times.

In addition, when the mixture contains the organic binder, it may be possible to apply a degreasing process to the thixomolding material 10 after the drying step S106.

3.4. Effect Obtained from the Method of Manufacturing a Thixomolding Material According to the Embodiment As described above, the method of manufacturing the thixomolding material 10 according to the embodiment includes the preparation step S102, the agitating step S104, and the drying step S106. The preparation step S102 includes preparing the mixture containing the metal body 11, the coating particle 14, the interposed particle 15, and the dispersion medium. The agitating step S104 includes agitating the mixture. The drying step S106 includes causing the coating particles 14 to be attached to the front surface of the metal body 11 through the interposed particle 15 by removing at least a portion of the dispersion medium from the agitated mixture.

With such a configuration, it is possible to firmly anchor the metal body 11 with the coating particles 14 through the interposed particle 15, which makes it possible to manufacture the thixomolding material 10 in which the coating particles 14 are less likely to fall off. Such a thixomolding material 10 allows the semi-melted substance of the metal body 11 and the coating particles 14 to be uniformly mixed when being fed in the heating cylinder 7 during thixomolding. This makes it possible to uniformly disperse the coating particles 14 in the thixomolded body. Thus, it is possible to manufacture the thixomolded body having a high added value and having the properties derived from the coating particles 14 while maintaining the properties derived from the metal body 11.

Furthermore, as described above, the mass fraction of the coating particles 14 in the total mass of the metal body 11 and the coating particles 14 is preferably not less than 1.0 mass % and not more than 40.0 mass %, is more preferably not less than 1.5 mass % and not more than 30.0 mass %, and is yet more preferably 5.0 mass % or more 20.0 mass %. In addition, as described above, on the assumption that the content of coating particles 14 is set as 100 parts by mass, the content of the interposed particle 15 is preferably not less than 3 parts by mass and not more than 30 parts by mass, is more preferably not less than 5 parts by mass and not more than 25 parts by mass, and is yet more preferably not less than 10 parts by mass and not more than 20 parts by mass.

By setting the mass fraction of the coating particles 14 to fall in the ranges described above, it is possible to add the property derived from the coating particles 14 to the thixomolded body, without largely deteriorating the advantage derived from the metal body 11 to be manufactured. In addition, it is possible to suppress occurrence of excess coating particles 14 to reduce the number of coating particles 14 that fall off, and it is also possible to suppress a deterioration in the molding property of the thixomolding material 10. Furthermore, by setting the content of the interposed particle 15 relative to the coating particles 14 to fall in the ranges described above, it is possible to set the content of the interposed particle 15 to a necessary and sufficient amount that enables the coating particles 14 to be anchored at the metal body 11.

In particular, it is preferable that the inorganic oxide is a silicon oxide, as described above. A silicon oxide combines with magnesium to generate an alloy or intermetallic compound, which makes it possible to enhance the mechanical property of the thixomolded body. In addition, a silicon oxide causes a large number of hydroxy groups to be generated at the front surface of the interposed particle 15, and hence, is useful as a constituent element of the interposed particle 15 that strongly interacts with the metal body 11 and the coating particles 14. Thus, by using a silicon oxide as the inorganic oxide, it is possible to manufacture the thixomolding material 10 in which the coating particles 14 are particularly less likely to fall off.

The average particle diameter of the interposed particle 15 is preferably not less than 1 nm and not more than 100 nm, is more preferably not less than 10 nm and not more than 80 nm, and is yet more preferably not less than 20 nm and not more than 60 nm, as described above. When the average particle diameter falls in the ranges described above, the interposed particle 15 particularly easily enters a portion between the metal body 11 and the coating particles 14 or between coating particles 14. In addition, the specific surface area of the interposed particle 15 particularly increases. Thus, by setting the average particle diameter of the interposed particle 15 so as to fall in the ranges described above, it is possible to manufacture the thixomolding material 10 in which the coating particles 14 are particularly less likely to fall off.

Note that the thixomolding material 10 described above may not need to be manufactured using this manufacturing method.

4. Thixomolded Body

Next, one example of the thixomolded body manufactured using the thixomolding material according to the embodiment described above will be described.

Figure 5:
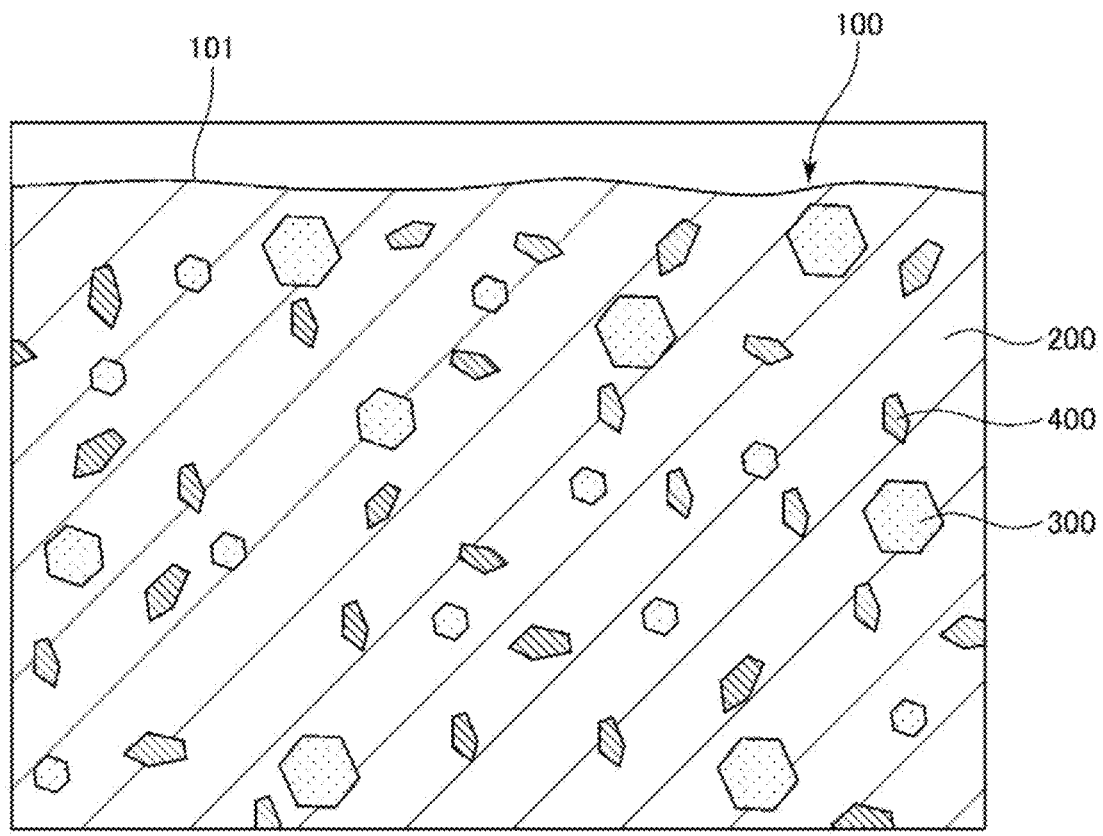
FIG. 5 is a partial cross-sectional view schematically illustrating one example of a thixomolded body manufactured using the thixomolding material according to the embodiment.

FIG. 5 is a partial cross-sectional view schematically illustrating one example of the thixomolded body manufactured using the thixomolding material according to the embodiment.

A thixomolded body 100 illustrated in FIG. 5 is a molded body obtained through the thixomolding method, and includes a matrix portion 200, a first particle portion 300, and a second particle portion 400. The matrix portion 200 is a structure derived mainly from the metal body 11, and contains magnesium (Mg) as a primary component. The first particle portion 300 is a structure derived mainly from the coating particles 14, and contains the constituent material of the coating particles 14 and a compound thereof, a decomposition product of the constituent material, or a compound with the decomposition product and other components. The second particle portion 400 is a structure derived mainly from the interposed particle 15, and contains the constituent material of the interposed particle 15 and a compound thereof, a decomposition product of the constituent material, or a compound with the decomposition product and other components.

Here, description will be made of an example in which the constituent material of the coating particle 14 is silicon and the constituent material of the interposed particle 15 is a silicon oxide. The thixomolded body 100 manufactured using the thixomolding material 10 containing these elements includes the first particle portion 300 containing $Mg_2Si$ as a primary component, and the second particle portion 400 containing MgO as a primary component. $Mg_2Si$ is a compound (Si+Mg→$Mg_2Si$) in which the constituent material of the coating particles 14 or the constituent material of the interposed particle 15 combines with magnesium (Mg). MgO is a compound ($SiO_2$+4Mg→$Mg_2Si$+2MgO) in which Mg combines with O that is the decomposition product of the constituent material of the interposed particle 15.

$Mg_2Si$ and MgO each have higher Young's modulus than magnesium (Mg). Thus, the first particle portion 300 and the second particle portion 400 each function as a strengthening agent used to increase the rigidity of the thixomolded body 100. Thus, the thixomolded body 100 including the first particle portion 300 and the second particle portion 400 has high rigidity.

In addition, the first particle portion 300 and the second particle portion 400 prevent the magnesium (Mg) crystal contained in the matrix portion 200 from getting coarse. This makes it possible to reduce the size of the magnesium crystal in the matrix portion 200. Thus, the thixomolded body 100 has a high mechanical strength.

In the thixomolded body 100 in FIG. 5, the first particle portion 300 and the second particle portion 400 uniformly disperse in the matrix portion 200. This is because the coating particles 14 are firmly anchored in the thixomolding material 10, which suppresses falling off. In other words, it is considered that, during thixomolding, the thixomolding material 10 can be uniformly blended within the heating cylinder 7, and this leads to the uniform dispersion of the first particle portion 300 and the second particle portion 400. In addition, with such uniform dispersion, it is possible to obtain the effect in which the thixomolded body 100 as a whole has high rigidity and high strength.

Note that the compositions of the first particle portion 300 and the second particle portion 400 differ in accordance with the constituent element of the thixomolding material 10.

For example, when silica ($SiO_2$), a magnesium oxide (MgO), or silicon carbide (SiC) is used as the constituent material of the coating particles 14 and a silicon oxide is used as the constituent material of the interposed particle 15, at least the matrix portion 200, the first particle portion 300, and the second particle portion 400 each having the compositions described above can be recognized in the thixomolded body 100. With this configuration, it is possible to increase the specific strength and the specific rigidity of the thixomolded body 100.

Note that elementary analysis is used to identify the matrix portion 200, the first particle portion 300, and the second particle portion 400.

For example, the elementary analysis method includes iron and steel—atomic absorption spectrometric method specified in JIS G 1257: 2000, iron and steel—ICP atomic emission spectrometric method specified in JIS G 1258: 2007, iron and steel—method for spark discharge atomic emission spectrometric analysis specified in JIS G 1253: 2002, iron and steel—fluorescent x-ray analysis specified in JIS G 1256: 1997, weight titration absorption spectrophotometry specified in JIS G 1211 to G 1237, and the like.

In addition, the tensile strength of the thixomolded body 100 is preferably not less than 180 MPa and not more than 300 MPa, and is more preferably not less than 190 MPa and not more than 250 MPa. Furthermore, the Young's modulus of the thixomolded body 100 is preferably not less than 43 GPa and not more than 80 GPa, and is more preferably not less than 48 GPa and not more than 70 GPa. By setting the tensile strength and the Young's modulus so as to fall in the ranges described above, the thixomolded body 100 particularly has a high specific strength and a high specific rigidity. Such a thixomolded body 100 is light weighted, and has high strength and high rigidity. Thus, the thixomolded body 100 is preferably used, for example, for a component used in a transport device such as a component for an automobile and a component for an airplane, and a component used in a mobile device such as a mobile terminal and a laptop computer.

Furthermore, the 0.2% proof stress of the thixomolded body 100 is preferably not less than 155 MPa and not more than 300 MPa, and is more preferably not less than 165 MPa and not more than 240 MPa.

The tensile strength and the 0.2% proof stress of the thixomolded body 100 are measured in the following manner. First, a test piece is cut out from the thixomolded body 100. The test piece includes, for example, a No. 13 test piece or the like specified in JIS. Next, the test piece is attached to a tensile testing device to calculate a stress corresponding to the maximum force acting on the test piece at 25° C. The thus obtained stress is set as tensile strength of the thixomolded body 100. In addition, in the stress-strain curve obtained through the measurement, the stress corresponding to a point of 0.2% strain is set as the 0.2% proof stress.

In addition, the Young's modulus of the thixomolded body 100 is measured in the following manner. First, a test piece is cut out from the thixomolded body 100. Next, the test piece is attached to a tensile testing device to apply tensile load to the test piece at 25° C. Next, calculation is performed for the amount of change in the tensile strain at the time of varying the tensile load and the amount of change in the tensile stress at the time of varying the tensile load. In addition, a ratio of the latter amount of change relative to the former amount of change is calculated to set this as the Young's modulus of the thixomolded body 100. Note that the Young's modulus of the thixomolded body 100 may be a value measured using a method other than the measurement method described above, for example, a value measured using a resonance method or an ultrasonic-wave pulse method.

Furthermore, the Vickers hardness of a front surface 101 of the thixomolded body 100 is preferably not less than 75 and not more than 200, is more preferably not less than 80 and not more than 120, and is yet more preferably not less than 85 and not more than 100. By setting the Vickers hardness so as to fall in the ranges described above, it is possible to achieve the thixomolded body 100 of which front surface has high hardness and is resistant to scratch or the like. The Vickers hardness of the front surface 101 of the thixomolded body 100 is measured in accordance with the test method for Vickers hardness specified in JIS Z 2244: 2009. Note that the measurement load is set to 5 kgf.

The thixomolding material, the method of manufacturing a thixomolding material, and the thixomolded body according to the present disclosure have been described on the basis of the embodiment with reference to the drawings. However, the thixomolding material according to the present disclosure is not limited to that in the embodiment, and, for example, any given constituent element may be added to the embodiment. Furthermore, the method of manufacturing a thixomolding material according to the present disclosure may be a method to which a process that is given to achieve any given purpose is added to the embodiment.

EXAMPLES

Next, specific examples according to the present disclosure will be described.

5. Manufacturing a Thixomolding Material 5.1. Sample No. 1

First, a magnesium alloy chip serving as the metal body, a silicon (Si) particle serving as the coating particle, a silicon oxide (silica, $SiO_2$) particle serving as the interposed particle, and IPA (isopropyl alcohol) serving as the dispersion medium were mixed to obtain a mixture. Note that a 4 mm×2 mm×1 mm chip of AZ91D alloy manufactured by STU, Inc. was used for the magnesium alloy chip. Note that the AZ91D alloy is an magnesium-based alloy containing 9 mass % of Al and 1 mass % of Zn. Colloidal silica that disperses in water in the form of colloid was used for the silicon oxide particle. Table 1 shows the average particle diameters of the silicon particle and the silicon oxide particle and the amounts of addition of the silicon particle and the silicon oxide particle.

Next, the mixture was agitated. A method of shaking a container that accommodates the mixture was used for the agitation.

Then, the agitated mixture was heated to dry. Thus, a sample No. 1 of the thixomolding material was obtained. Note that Table 1 also shows drying conditions.

5.2. Sample No. 2

A sample No. 2 of a thixomolding material was obtained in a manner similar to that of the sample No. 1 except that a graphite particle is used as the coating particle. A sample No. 2 of a thixomolding material was obtained in a manner similar to that of the sample No. 1 except that a graphite particle is used as the coating particle.

5.3. Sample No. 3

A sample No. 3 of a thixomolding material was obtained in a manner similar to that of the sample No. 1 except that a silicon carbide particle is used as the coating particle. A sample No. 3 of a thixomolding material was obtained in a manner similar to that of the sample No. 1 except that a silicon carbide particle is used as the coating particle.

5.4. Sample No. 4

A sample No. 4 of a thixomolding material was obtained in a manner similar to that of the sample No. 3 except that an aluminum oxide (alumina, $Al_2O_3$) particle is used as the interposed particle. A sample No. 4 of a thixomolding material was obtained in a manner similar to that of the sample No. 3 except that an aluminum oxide (alumina, $Al_2O_3$) particle is used as the interposed particle.

5.5. Sample No. 5

A sample No. 5 of a thixomolding material was obtained in a manner similar to that of the sample No. 3 except that a zirconium oxide (zirconia, $ZrO_2$) particle is used as the interposed particle. A sample No. 5 of a thixomolding material was obtained in a manner similar to that of the sample No. 3 except that a zirconium oxide (zirconia, $ZrO_2$) particle is used as the interposed particle.

5.6. Sample Nos. 6 to 9

Sample Nos. 6 to 9 of a thixomolding material were obtained in a manner similar to that of the sample No. 1 except that conditions for manufacturing a thixomolding material were changed to those shown in Table 1. Sample Nos. 6 to 9 of a thixomolding material were obtained in a manner similar to that of the sample No. 1 except that conditions for manufacturing a thixomolding material were changed to those shown in Table 1.

5.7. Sample No. 10

A sample No. 10 of a thixomolding material was obtained in a manner similar to that of the sample No. 1 except that paraffin wax is used instead of the interposed particle. A sample No. 10 of a thixomolding material was obtained in a manner similar to that of the sample No. 1 except that paraffin wax is used instead of the interposed particle. A specific manufacturing method will be described below.

First, a magnesium alloy chip serving as the metal body, a silicon particle serving as the coating particle, paraffin wax, and the dispersion medium were mixed to obtain a mixture. Note that the amount of addition of paraffin wax was set to 5.0 mass % of solid content in the mixture.

Next, the thus obtained mixture was heated to obtain a dry body. Then, the thus obtained dry body was agitated. A method of shaking a container that accommodates the dry body was used for the agitation.

Next, a degreasing process is applied to the agitated dry body. The degreasing process is a process of heating for 10 hours at 320° C. in the atmospheric air. Through this process, at least a portion of paraffin wax was removed to obtain the thixomolding material. In the obtained thixomolding material, almost entire front surface of the magnesium alloy was covered with Si particles.

5.8. Sample No. 11

A sample No. 11 of a thixomolding material was obtained in a manner similar to that of the sample No. 10 except that a graphite particle was used as the coating particle. A sample No. 11 of a thixomolding material was obtained in a manner similar to that of the sample No. 10 except that a graphite particle was used as the coating particle.

5.9. Sample No. 12

A sample No. 12 of a thixomolding material was obtained in a manner similar to that of the sample No. 10 except that a silicon carbide particle was used as the coating particle. A sample No. 12 of a thixomolding material was obtained in a manner similar to that of the sample No. 10 except that a silicon carbide particle was used as the coating particle.

Note that, in Table 1, the thixomolding materials of the sample Nos. corresponding to the present disclosure are denoted with "Example", and the thixomolding materials of the sample Nos. not corresponding to the present disclosure are denoted with "Comparative Example".

6. Evaluation of Thixomolding Material

The thixomolding material of each of the sample Nos. was evaluated using the following method in terms of how likely the coating particles fall off.

First, preliminary separation is performed to the thixomolding materials for three minutes with the shaking amplitude being 0.5 mm. This preliminary separation is performed to remove a coating particle that is not attached to the magnesium alloy chip and exists alone. Thus, the opening of a sieve was set to a size that allows only the coating particle to pass through. The "a" represents a mass of the thixomolding material left on the sieve after the preliminary separation.

Next, main separation was performed, for three minutes with the shaking amplitude being 1.5 mm, to the thixomolding material that has been subjected to the preliminary separation. Note that electromagnetic sieve shaker AS200 manufactured by Verder Scientific was used for the preliminary separation and the main separation. The "b" represents a mass of the thixomolding material left on the sieve after the main separation.

Next, the ratio of a mass difference "a-b" relative to the mass "a" after the preliminary separation is calculated as a ratio at which the coating particle falls off. The result of calculation is shown in Table 1.

TABLE 1

| Sample No. | Example/ Comparative Example | Coating particle | | | Interposed particle | | | Evaluation result |
| | | Type | Average particle diameter μm | Amount of addition mass % | Type | Average particle diameter nm | Particle size ratio | Amount of addition parts by mass | Ratio at which coating particle falls off % |
| --- | --- | --- | --- | --- | --- | --- | --- | --- | --- |
| 1 | Example | silicon | 5 | 10.0 | silica | 45 | 0.900 | 10.0 | 3 |
| 2 | Example | graphite | 10 | 10.0 | silica | 45 | 0.450 | 10.0 | 5 |
| 3 | Example | silicon carbide | 15 | 10.0 | silica | 45 | 0.300 | 10.0 | 4 |
| 4 | Example | silicon carbide | 15 | 10.0 | alumina | 20 | 0.133 | 10.0 | 2 |

TABLE 1-continued

| | | Manufacturing condition for thixomolding material | | | | | | | Evaluation result |
|---|---|---|---|---|---|---|---|---|---|
| | | Coating particle | | | Interposed particle | | | | Ratio at which |
| Sample No. | Example/ Comparative Example | Type | Average particle diameter μm | Amount of addition mass % | Type | Average particle diameter nm | Particle size ratio % | Amount of addition parts by mass | coating particle falls off % |
| 5 | Example | silicon carbide | 15 | 10.0 | zirconia | 90 | 0.600 | 10.0 | 5 |
| 6 | Example | silicon | 25 | 15.0 | silica | 12 | 0.048 | 5.0 | 8 |
| 7 | Example | silicon | 35 | 20.0 | silica | 25 | 0.071 | 15.0 | 7 |
| 8 | Example | silicon | 3 | 5.0 | silica | 80 | 2.667 | 20.0 | 6 |
| 9 | Example | silicon | 10 | 10.0 | silica | 12 | 0.120 | 3.0 | 7 |
| 10 | Comparative Example | silicon | 5 | 10.0 | paraffin wax | | | 5.0 mass % | 10 |
| 11 | Comparative Example | graphite | 5 | 10.0 | paraffin wax | | | 5.0 mass % | 12 |
| 12 | Comparative Example | silicon carbide | 5 | 10.0 | paraffin wax | | | 5.0 mass % | 13 |

As shown in Table 1, the thixomolding materials corresponding to Examples exhibit a reduced ratio at which the coating particle falls off, as compared with the thixomolding materials corresponding to Comparative Examples.

Thus, thixomolding was performed using the sample No. 1 (Example) of the thixomolding material and the sample 10 (Comparative Example) of the thixomolding material to obtain a thixomolded body. Next, the thus obtained thixomolded body was cut, and the cutting surface was observed using an optical microscope.

As a result, the thixomolded body manufactured using the sample No. 1 (Example) of the thixomolding material shows that a particle portion containing $Mg_2Si$ as a primary component uniformly disperses in a matrix portion containing magnesium (Mg) as a primary component. In contrast, the thixomolded body manufactured using the sample No. 10 (Comparative Example) of the thixomolding material shows that a particle portion containing $Mg_2Si$ as a primary component partially unevenly disperses. This result was due to a fact that, in a case of the sample No. 10 of the thixomolding material, the coating particles are not sufficiently anchored, and a large number of coating particles fall off during the shaking test.

Next, the Young's modulus was measured on the obtained thixomolded body. As a result, the thixomolded body manufactured using the sample No. 1 of the thixomolding material exhibits high Young's modulus, as compared with the thixomolded body manufactured using the sample No. 10 of the thixomolding material. From these results, it can be understood that the present disclosure provides effects in which: it is possible to obtain the thixomolding material in which the number of coating particles that fall off is reduced; by using this thixomolding material, it is possible to obtain the thixomolded body in which the structure derived from the coating particles uniformly disperses; and this thixomolded body exhibits excellent mechanical properties as compared with a thixomolded body having reduced uniformity in the structure derived from the coating particles.

What is claimed is:

1. A thixomolding material comprising:
   a metal body containing magnesium (Mg) as a primary component; and
   a coating layer covering an entirety of an outer surface of the metal body, the coating layer including a plurality of coating particles that each have an average particle diameter equal to or less than 100 μm, and the plurality of coating particles being made of an inorganic material differing from the metal body;
   wherein the coating layer includes a plurality of interposed particles dispersed in a binder that are interposed between the metal body and the plurality of coating particles, the interposed particles each having an average particle diameter smaller than the plurality of coating particles, and the interposed particles being made of an inorganic oxide that is at least one of alumina and zirconia, and
   wherein the binder includes a wax.

2. The thixomolding material according to claim 1, wherein a mass fraction of the coating particles in a total mass of the metal body and the coating particles is not less than 1.0 mass % and not more than 40.0 mass %.

3. The thixomolding material according to claim 1, wherein a constituent material of the coating particles includes a metal material, a ceramic material, a silicon material, or a carbon material.

4. The thixomolding material according to claim 1, wherein the inorganic oxide is a silicon oxide.

5. The thixomolding material according to claim 1, wherein an average particle diameter of the interposed particle is not less than 1 nm and not more than 100 nm.

6. The thixomolding material according to claim 1, wherein, when a content of the coating particles is set as 100 parts by mass, a content of the interposed particle is not less than 3 parts by mass and not more than 30 parts by mass.

* * * * *